United States Patent

Schaeffer

[15] 3,668,257
[45] *June 6, 1972

[54] OXIDATION OF OLEFINS

[72] Inventor: William D. Schaeffer, Pomona, Calif.

[73] Assignee: Union Oil Company of California, Los Angeles, Calif.

[ * ] Notice: The portion of the term of this patent subsequent to May 24, 1983, has been disclaimed.

[22] Filed: Aug. 8, 1966

[21] Appl. No.: 570,745

Related U.S. Application Data

[63] Continuation-in-part of Ser. No. 240,131, Nov. 26, 1962, abandoned.

[52] U.S. Cl. ............260/604 AC, 260/533 R, 260/597 B, 260/598, 260/632 C, 260/497 A, 260/592, 260/590, 260/599, 260/340, 260/523 R
[51] Int. Cl. ...........................................C07c 47/06
[58] Field of Search..............260/604 AC, 533, 597, 533 R, 260/597 B, 598

[56] References Cited

UNITED STATES PATENTS 3,154,586  10/1964  Bander et al........................260/604 X
3,149,167  9/1964   Hornig et al. ......................260/604 X
3,253,020  5/1966   Schaeffer............................260/604

FOREIGN PATENTS OR APPLICATIONS 886,157   1/1962   Great Britain ....................260/604 X
876,024   8/1961   Great Britain ....................260/604 X Primary Examiner—Leon Zitver
Assistant Examiner—R. H. Liles
Attorney—Milton W. Lee, Richard C. Hartman, Lannas S. Henderson and Robert E. Strauss

[57] ABSTRACT

Hydrocarbon olefins are oxidized to carbonyl compounds by contacting the olefin and oxygen with a liquid phase reaction medium containing water, a carboxylic acid and as the only catalyst components a Group VIII noble metal and an alkali metal ammonium or hydrogen chloride or bromide. The reaction proceeds at a high conversion rate despite the absence of any recognized redox agent for the Group VIII noble metal to produce acetaldehyde from ethylene, acetone from propylene and methylethyl ketone from butene.

11 Claims, No Drawings

OXIDATION OF OLEFINS

This application is a continuation-in-part of Ser. No. 240,131, filed Nov. 26, 1962, now abandoned.

This invention relates to the oxidation of olefins to valuable chemicals, particularly to carbonyl compounds and/or carboxylic acids.

In a specific embodiment, this invention relates to the oxidation of ethylene to acetaldehyde and/or acetic acid.

It is known that carbonyl compounds can be obtained by contacting an olefin with an aqueous solution of palladous halide. Oxidation of the olefin results in reduction of the noble metal salt to the metal. The commercialization of this reaction has been possible only by the development of a facile oxidation of the noble metal to its higher valency since the noble metal resists oxygen oxidation. Prior investigators have reported that a facile oxidation can only be achieved by use of a suitable redox agent such as a cupric or ferric salt which can be maintained at its highest valency by oxygen and when at such valency will oxidize the noble metal to its higher valency; see Smidt et al., *Angewandte Chemie*, Vol. 71, No. 5, p. 176-182 (1959).

While this technique achieves commercially attractive oxidation rates, inclusion of a redox salt in the reaction medium engenders other difficulties. The redox salts have limited solubility in their reduced state and will precipitate from the reaction medium. Oxidation byproducts, notably oxalic acid, will also precipitate the redox salts and thus inhibit the oxidation.

I have now found that a facile oxidation of the noble metal can be achieved in aqueous carboxylic acid solvents containing a requisite concentration of a soluble halide without the necessity to employ and redox agents.

The process of this invention therefore comprises contacting an olefin with oxygen in the presence of an aqueous reaction medium of a hereafter defined composition which contains catalytic amounts of a Group VIII noble metal and a soluble halide. In a specific embodiment, oxygen and ethylene are introduced into a reaction zone containing a reaction medium comprising a mixture of between about 5 and about 100 parts water and from 0 to 95 parts acetic acid which contains a halide and a Group VIII noble metal. In general, the halide is dissolved in the reaction medium in amounts between about 0.05 and about 2.0 weight percent. The Group VIII noble metal, preferably palladium, is present as a dissolved salt and/or suspended in metallic form in amounts between about 0.05 and about 2.0 weight percent.

At reaction temperatures between about 50° and about 600° F. and pressures sufficient to maintain a liquid phase, the ethylene is oxidized to acetaldehyde and/or acetic acid and the distribution of either these chemicals and the rate of the oxidation can be controlled by the amount of water employed in the reaction medium mixture.

Referring now to other hydrocarbon olefins which can be oxidized to carbonyl compounds and/or carboxylic acids in accordance with my invention, any of the following can be used:

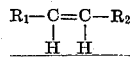

wherein:

The total number of carbon atoms are two to about 10; and $R_1$ and $R_2$ are hydrogen, aryl, e.g., phenyl, naphthyl, tolyl, etc., alkaryl, e.g., benzyl, p-cuminyl, etc.; alkyl, e.g., methyl, lauryl, isopropyl, etc.

Examples of suitable olefins are the $C_2-C_{10}$ alkenes and cycloalkenes such as propylene, butene, pentene, hexene, heptene, cyclohexene, indene, as well as aryl substituted alkenes such as styrene, allyl benzene, vinyl toluene, vinyl xylene, etc. As previously mentioned, ethylene is preferred as a source of acetaldehyde and/or acetic acid; however, ketones, e.g., acetone, methylethyl ketone, indone, hexone, etc., can be obtained by the oxidation of the olefin higher molecular weight homologs of ethylene. In general, any hydrocarbon olefin having one or more hydrogens on each of the carbons bearing the double bond can be oxidized in accordance with my invention; alkene having two to about 10 carbons are preferred raw materials; however, it is of course apparent that such alkenes can also be substituted with an aryl group along their chain length.

The reaction medium comprises a mixture of water and a carboxylic acid although other organic liquids which are inert to the reaction can also be present such as formamide, dimethyl formamide, chlorobenzene, aliphatic hydrocarbons such as hexane, decane, dodecane, etc.; toluene, benzene, xylene, etc.

The carboxylic acid preferably should have some water solubility at the reaction conditions to avoid separate liquid phases. Accordingly, the lower molecular weight alkanoic acids having from one to five carbons are preferred such as formic, acetic, propionic, butyric, isobutyric, valeric, isovaleric, etc. Aliphatic dicarboxylic acids having up to 10 carbons are water soluble and can also be used such as malonic, succinic, glutaric, adipic, pimellic, suberic, azelic, sebacic, etc.

As previously mentioned, a Group VIII noble metal in combination with a halide is employed as the catalyst for the oxidation. Of the noble metals, platinum, rhodium, ruthenium, osmium, iridium and palladium, the latter is preferred because of its relatively high catalytic activity. In general, the metal is employed in amounts between about 0.001 and 5.0 weight percent of the liquid reaction medium; preferably between about 0.05 and about 2.0 weight percent. The noble metal can be added to the liquid medium as finely divided metal, as a soluble salt or as a chelate. Examples of suitable salts are the halides and acetates. Preferably the bromine salts, e.g. palladium bromide, are used. Examples of suitable chelates are palladium acetoacetonate, and complexes of the metal ion with such conventional chelating agents as ethylene diamine tetraacetic acid, citric acid, etc.

The halide, which can be a chloride or bromide, can be added to the organic liquid as a soluble salt, hydrogen halide or elemental halogen. Preferably, hydrogen chloride or bromide are employed. Examples of suitable salts are ammonium or alkali metal salts, e.g., sodium bromide, potassium chloride, lithium bromide, cesium bromide, etc.; ammonium chloride or bromide. Because of their greater activity, bromide compounds are preferred over chlorides. In general, sufficient of the aforementioned halogen compounds should be added to provide a concentration of between about 0.001 and about 5.0 weight percent; preferably between about 0.05 and about 2.0 and, most preferably, between about 0.1 and about 0.5 weight percent calculated as halogen in the liquid reaction medium.

The concentration of the halide depends somewhat on the concentration of the Group VIII noble metal in that the halide should be present in excess of the stoichiometric equivalent of the oxidized state of the noble metal. FIG. 1 illustrates the effect of excess halide on the oxidation rate for a typical reaction medium comprising 60 percent acetic acid, 40 percent water, 0.16 percent palladous chloride at a pH from 0 to 2.4. The relative rate of oxidation is plotted against the multiple of stoichiometric halide ions equivalent to the palladous ions initially supplied to the reaction. This data evidence that a halide concentration greater than the noble metal stoichiometric equivalent is necessary for the oxidation and that a relative concentration greater than 1 and less than about 20; preferably less than about 10 yields the most active reaction system.

The reaction conditions are relatively mild, temperatures between about 50° and about 600° F. can be used; preferably between about 150° and about 400° F. The reaction pressure is maintained at least sufficient to retain the reaction medium in liquid phase at the selected reaction temperature, generally between about 1 and about 50 atmospheres being sufficient. Higher pressures are preferred to obtain satisfactory rates of oxidation; between about 5 and about 50 atmospheres and most preferably between about 10 and about 50 atmospheres can be used.

The reaction is performed under acid pH values. An acid pH is exhibited by any of the previously mentioned mixtures of carboxylic acids and water, e.g., aqueous acetic acid has a pH of about 2.4. The pH value of the solvent can be from 0 to about 4 and preferably, for most active systems, should be from 0 to about 2.5. The preferred low pH values can be obtained by use of the hydrogen halides although addition of a neutral halide salt, e.g., sodium chloride, can be accompanied by addition of a mineral acid such as sulfuric, nitric, etc., or by the addition of an acid salt such as sodium hydrogen sulfate, etc., to lower the pH below that of the aqueous carboxylic acid when desired.

Reaction periods between about several seconds to about 1 hour are sufficient to obtain satisfactory conversion of the olefin feed. FIG. 2 illustrates that the actual reaction rate is influenced considerably by the composition of the reaction medium. In FIG. 2, the relative rate of oxidation is plotted against the concentration of water in the reaction medium for the reaction system described in Example 1. This behavior is typical of that obtained with other reaction systems within the scope of my invention. FIG. 2 illustrates that the oxidation rate is several-fold greater for reaction mediums containing between about 15 and about 90 weight percent water than for reaction mediums which have less than about 15 percent water or greater than about 90 percent water. In an entirely aqueous reaction solvent the oxidation is extremely slow and such a solvent is unsuited for commercial use according to my invention. The highest oxidation rates are achieved in solvents comprising from 20 to about 75 percent water in any of the aforementioned inert organic solvents. Preferably, reaction periods of between about 1 and about 60 minutes are sufficient to obtain a high conversion of the olefin feed. Suitably, the desired reaction period is obtained by concurrently flowing a liquid stream of the reaction medium containing the soluble or suspended catalyst through the reaction zone with a stream of the olefin and an oxygen-containing gas.

The olefin and oxygen-containing gas such as air, oxygen or mixtures thereof, are supplied to the reaction zone in suitable proportions, preferably to avoid the formation of an explosive gas phase. In general, the maximum oxygen concentration should be less than about 20 volume percent of the gas mixture, preferably between about 1 and about 10 volume percent of the gas to the reactor. The olefin feed can be supplied to the reactor in excess quantities, the unconverted portion being recovered and recycled to the reactor. If desired, suitable vapor recovery steps can be employed to purify this olefin-containing stream from inerts generated or used in the process, e.g., nitrogen, carbon dioxide, carbon monoxide, etc.

As previously mentioned, the concentration of water in the liquid reaction medium exerts a considerable influence on the nature of the oxidation product. I have found that when the concentration of water is maintained, less than about 20 weight percent and preferably between about 5 and about 20 weight percent, the predominant product from the oxidation of ethylene is acetaldehyde. Use of higher concentrations of water, i.e., between about 20 and about 75 weight percent, results in the oxidation of ethylene and/or acetaldehyde to acetic acid. Use of water in concentrations greater than about 75 weight percent again favors the oxidation of the olefin to carbonyl compounds, i.e., acetaldehyde and ketones. This behavior also probably reflects the high rate of oxidation which coincides with the greater yields of acetic acid since the higher oxidation rate produces a greater relative concentration of acetaldehyde in the reaction medium which would influence its oxidation to acetic acid.

The following examples will illustrate the process of my invention:

EXAMPLE I

A 1-gallon autoclave fitted with a Teflon cup, titanium cooling coil and stirrer was charged with 500 grams of a liquid reaction medium which contained 3.5 grams of 48 percent strength hydrobromic acid and 1.5 grams of palladium chloride. The autoclave was then pressured to 500 psig with ethylene, heated to 300° F. and nitrogen then added to raise the pressure to 900 psig. Oxygen was then slowly added to maintain the pressure at about 900 psig over a reaction period of 30 minutes. This procedure was repeated for a series of experiments in which the reaction medium composition was varied from 0 to 100 weight percent water and the organic liquid concentration was varied from 0 to 100 weight percent. Table 1 presents the yields of products obtained from each of the experiments and the conversion rate data were used in preparation of FIG. 2.

TABLE 1.—ETHYLENE OXIDATION

| | Exp. 1 | Exp. 2 [a] | Exp. 3 | Exp. 4 | Exp. 5 | Exp. 6 | Exp. 7 | Exp. 8 | Exp. 9 | Exp. 10 |
|---|---|---|---|---|---|---|---|---|---|---|
| Water content of solvent (wt. percent) | 0 | 4 | 7 | 10 | 15 | 20 | 30 | 50 | 90 | 100 |
| Amount of ethylene oxidized (grams) | 14.2 | 28.5 | 26.6 | 30.4 | 44.5 | 57.4 | 41.9 | 58.5 | 21.5 | 3.6 |
| Products, mol percent: | | | | | | | | | | |
| Acetaldehyde | 46.9 | 51.4 | 70.9 | 66.4 | 65.2 | 33.5 | 31.5 | 16.2 | 66.8 | 93.0 |
| Vinyl acetate | 39.5 | 33.8 | 23.1 | 10.8 | | 2.3 | 2.9 | 1.0 | | |
| Methylethylketone and ethyl acetate | | | | | | 5.3 | 5.7 | 4.1 | 7.2 | 7.0 |
| Acetic acid | | | | 16.9 | 23.1 | 45.7 | 46.9 | 71.7 | 26.0 | |
| Diester | 6.9 | 3.4 | 3.6 | 3.8 | 4.3 | 8.7 | 11.4 | 4.3 | | |
| Polymer | 6.9 | 11.6 | 2.4 | 2.1 | 1.5 | 4.5 | 1.6 | 2.7 | | |

[a] One hour contact.

EXAMPLE II

The autoclave was charged with 500 grams of an acetic acid liquid reaction medium containing 1.5 grams of palladium chloride and 3.0 to 3.5 grams of 48 percent strength hydrobromic acid. Propylene was charged to the autoclave in amounts indicated below for a series of experiments in which the water content of the reaction medium was varied. The autoclave was heated to 300°–320° F. and pressured to 900 psig with nitrogen. Oxygen was slowly introduced to maintain the pressure and 900 psig over the reaction period. The following table summarizes the varied conditions and the results:

TABLE 2

Propylene Oxidation

| | Exp. 10 | Exp. 11 [a] | Exp. 12 |
|---|---|---|---|
| Water Content of Solvent (Weight Percent) | 0 | 4 | 30 |
| Reaction time, minutes | 60 | 60 | 20 |
| Olefin, grams | 108 | 103 | 146 |
| Products (grams) | | | |
| Acetaldehyde | 1.2 | 0.6 | 2.1 |
| Acetone | 13.1 | 10.3 | 49.6 |
| Isopropanol | 1.8 | 2.6 | — |
| Isopropyl acetate | 5.5 | 3.3 | — |

[a] Solvent comprised 50 grams acetic acid, 20 grams water and 430 grams butyrolactone.

EXAMPLE III

The autoclave was charged with 500 grams of an aqueous acetic acid reaction medium containing 1.5 grams of palladium chloride and 3.0–3.5 grams of 48 percent strength hydrobromic acid. Butene was charged to the autoclave in amounts indicated below for a series of experiments in which the reaction medium composition was varied. The autoclave was heated to 300° F., pressured with nitrogen to 900 psig and then oxygen was slowly introduced over the reaction period. The following table summarizes the varied conditions and the results:

TABLE 3.—BUTENE OXIDATION

|  | Exp. 13 | Exp. 14[a] | Exp. 15 | Exp. 16 |
|---|---|---|---|---|
| Water content of solvent (wt. percent) | 0 | 4 | 30 | 30 |
| Olefin: |  |  |  |  |
| Identity | [b] | [b] | [c] | [b] |
| Amount (grams) | 111 | 112 | 186 | 146 |
| Reaction period (minutes) | 30 | 60 | 30 | 30 |
| Products (grams): |  |  |  |  |
| Acetaldehyde | 2.3 | 0.5 | 9.2 | 9.6 |
| Methylethyl ketone | 1.8 | 3.5 | 77.0 | 79.0 |
| Sec-butyl acetate |  |  | 1.0 |  |
| 2,3-diacetoxybutane | 49.0 |  |  |  |
| Acetic acid |  | 12.0 |  |  |
| Sec-butyl alcohol | 1.0 |  |  |  |
| Butylene glycol monoacetate |  |  | 14.0 | 11.0 |

[a] Solvent comprised 20 grams water and 480 grams butyrolactone.
[b] Butene-2.
[c] Butene-1.

The preceding examples illustrate a batch oxidation of olefins wherein the reported reaction medium composition is the composition charged to the autoclave. It should be realized that this composition increases in water content slightly during the oxidation by accumulation of water of reaction. In commercial utilization of my invention, such batch oxidation can be used, but most preferably a continuous process is used wherein the catalyst solution, olefin and oxygen containing gas are continuously charged to the reactor. High olefin rates are also employed in this adoption with the excess olefin being recycled for further oxidation. A stream of the liquid contents of the reactor is continuously withdrawn, reduced in pressure in a flash zone to release dissolved olefin — which can be recycled — and thereafter distilled to separate the aldehyde or ketone product. The liquid residue from this distillation is then distilled to remove the water and preferably this distillation is performed by adding a material which forms a water azeotrope such as esters, e.g., vinyl acetate, butyl acetate, etc.; hydrocarbons such as benzene, toluene, etc. The dehydrated residue can then be recycled to the reaction zone. In this manner, the degree of dehydration of the recycle stream as well as the recycle rate can be controlled to maintain the desired water concentration in the reaction zone.

The recovery steps for the oxidized products from the crude reaction mixture resulting from various olefins depends on the boiling points of such products or their water azeotropes; the development of such steps being within the skill of the art. In general, the organic component of the reaction liquid should have a higher boiling point than the oxidized olefin product to permit distillation of the product. The recycle stream is preferably dehydrated to control the water content in the reactor and preferably this is accomplished by azeotropic distillation with an extraneous agent which is added to the stream or by azeotropic distillation of the oxidized product, e.g., methylethyl ketone will azeotrope with water and no extraneous azeotrope agent need be added.

When ethylene is subjected to oxidation, there are formed acetic acid and acetaldehyde. Preferably, aqueous acetic acid is the reaction medium with from 5 to about 90 weight percent water. The acetaldehyde product is recovered in the first fractionation, the residue is dehydrated by azeotropic distillation of the water with benzene or butyl acetate, and the net production of acetic acid is removed in a third fractionation step. The remaining acetic acid in the residue from the third fractionation contains the catalyst components, i.e., palladium and halogen salts and is recycled to the reactor. Makeup catalyst components can be added to this recycle as needed to maintain the necessary palladium and halogen concentrations in the reactor.

EXAMPLE IV

The autoclave was charged with 400 grams acetic acid, 100 grams water and 1.5 grams palladium chloride. The autoclave was then pressured to 500 psig with ethylene, heated to 300° F. and nitrogen was then added to raise the pressure to 900 psi. Oxygen was then added to raise the pressure to 920 psi and the autoclave was maintained at the reaction temperature for 30 minutes; however, the pressure did not decline indicating that no oxygen reacted. Upon completion of the 30-minute period, the autoclave was cooled, depressured and opened. The palladium was present as the reduced metal and only a trace of acetaldehyde was present.

EXAMPLE V

The preceding Example IV was also performed with varied amounts of hydrochloric acid. The reaction solvent used was 360 grams acetic acid and 240 grams water. In a series of experiments 37 weight percent hydrochloric acid was added in 3, 10 and 20 milliliter amounts. The oxygen was introduced in 20 psi increments over a 10-minute reaction period; all other conditions were identical to the preceding Example IV. The following Table summarizes the results:

| Experiment | HCl (ml) | Atom Ratio Cl/Pd | Weight Increase | Temperature |
|---|---|---|---|---|
| 18 | 3 | 7 | 74 | 300°F. |
| 19 | 10 | 20 | 62 | 300°F. |
| 20 | 10 | 20 | 48 | 250°F. |
| 21 | 20 | 38 | 38 | 250°F. |

The yields of products were as follows:

| Experiment | 18 | 19 | 20 | 21 |
|---|---|---|---|---|
| Acetaldehyde | 51.5 | 78.7 | 50.7 | 54.0 |
| Acetic acid | 17.2 | 4.7 | 10.9 | 6.4 |
| Paraldehyde | 16.3 | — | 24.7 | 11.7 |
| Methyl acetate | 2.6 | 4.7 | 5.4 | 2.3 |
| Carbon monoxide | 2.6 | 2.7 | 15.3 |  |
| Carbon dioxide | 2.4 | 3.2 | 2.9 | 3.8 |
| Other | 7.0 | 5.8 | 5.0 | 6.8 |

The oxidation can also be performed with the addition of other halides such as the alkali metal or ammonium halides. To illustrate, comparable results were obtained when 4 grams sodium chloride and 10 grams of an acid salt, sodium hydrogen sulfate, were substituted for the hydrogen chloride of the previous experiments by charging the salts into the autoclave. Comparable results can also be obtained by charging the other acids such as propionic acid, oxalic acid, etc., into the autoclave in lieu of all or part of the acetic acid.

The preceding experiments and experiment 17 (Example IV) demonstrate the effect of halide ions on the oxidation and the necessity to provide halide ions in excess of the stoichiometric equivalent of the Group VIII noble metal cations, i.e., palladous ions.

The preceding examples are intended solely for illustration and are not to be construed as unduly limiting of my invention which comprises the method steps and their equivalents set forth in the following claims.

I claim:

1. The oxidation of a hydrocarbon mono-olefin having 2 to about 10 carbons to a carbonyl compound selected from the class of aldehydes, ketones and carboxylic acids having the same number of carbons as the mono-olefin that comprises simultaneously contacting the olefin and oxygen in an amount to provide a non-explosive gas mixture containing from 1 to 10 volume percent oxygen with a liquid reaction medium consisting of from 5 to about 95 weight percent water, an alkanoic acid having from one to five carbon atoms a catalyst consisting essentially of from 0.001 to 5.0 weight percent of a Group VIII noble metal and from 0.05 to 2.0 weight percent of a halide selected from the class consisting of alkali metal, ammonium and hydrogen chlorides and bromides; and maintaining said reaction medium at a temperature from about 50° to about 600° F. and a pressure sufficient to maintain said reaction medium in liquid phase.

2. The oxidation of claim 1 wherein said reaction medium is aqueous acetic acid containing 5 to 95 percent water.

3. The oxidation of claim 1 wherein said hydrocarbon olefin is an alkene.

4. The oxidation of claim 3 wherein said alkene is ethylene.

5. The oxidation of claim 1 wherein said Group VIII metal is palladium.

6. The oxidation of claim 1 wherein said halide is hydrogen chloride.

7. The oxidation of claim 1 wherein said reaction medium contains from 20 to about 75 percent water.

8. The oxidation of claim 1 wherein the pH of said reaction medium is maintained between 0 and 2.5.

9. The oxidation of claim 1 wherein the halide concentration is from 1 to about 20 times the stoichiometric equivalent of the noble metal.

10. The oxidation of claim 1 wherein the halide ion concentration is from 1 to about 10 times the stoichiometric equivalent of the noble metal concentration.

11. The oxidation of a hydrocarbon mono-olefin having 2 to about 10 carbon atoms to a carbonyl compound selected from the class of aldehydes, ketones and carboxylic acids having the same number of carbons as the mono-olefin which comprises contacting said mono-olefin with a liquid reaction medium consisting of an aqueous solution of an alkanoic acid having from one to five carbon atoms in about 20 to 75 weight percent water, from 0.5 to 2 weight percent of a halide selected from the class consisting of alkali metal, ammonium and hydrogen chlorides and bromides, and from 0.001 to 5 weight percent of a Group VIII noble metal at a temperature of from about 50° to about 600° F. and a pressure sufficient to maintain said reaction medium in liquid phase to oxidize said mono-olefin and reduce said Group VIII noble metal to a lower valency, and simultaneously regenerating said Group VIII noble metal of reduced valency by contacting said liquid reaction medium in the presence of said olefin with oxygen in an amount to provide a non-explosive gas mixture having less than 20 volume percent oxygen.

* * * * *